United States Patent Office 2,777,928
Patented Jan. 15, 1957

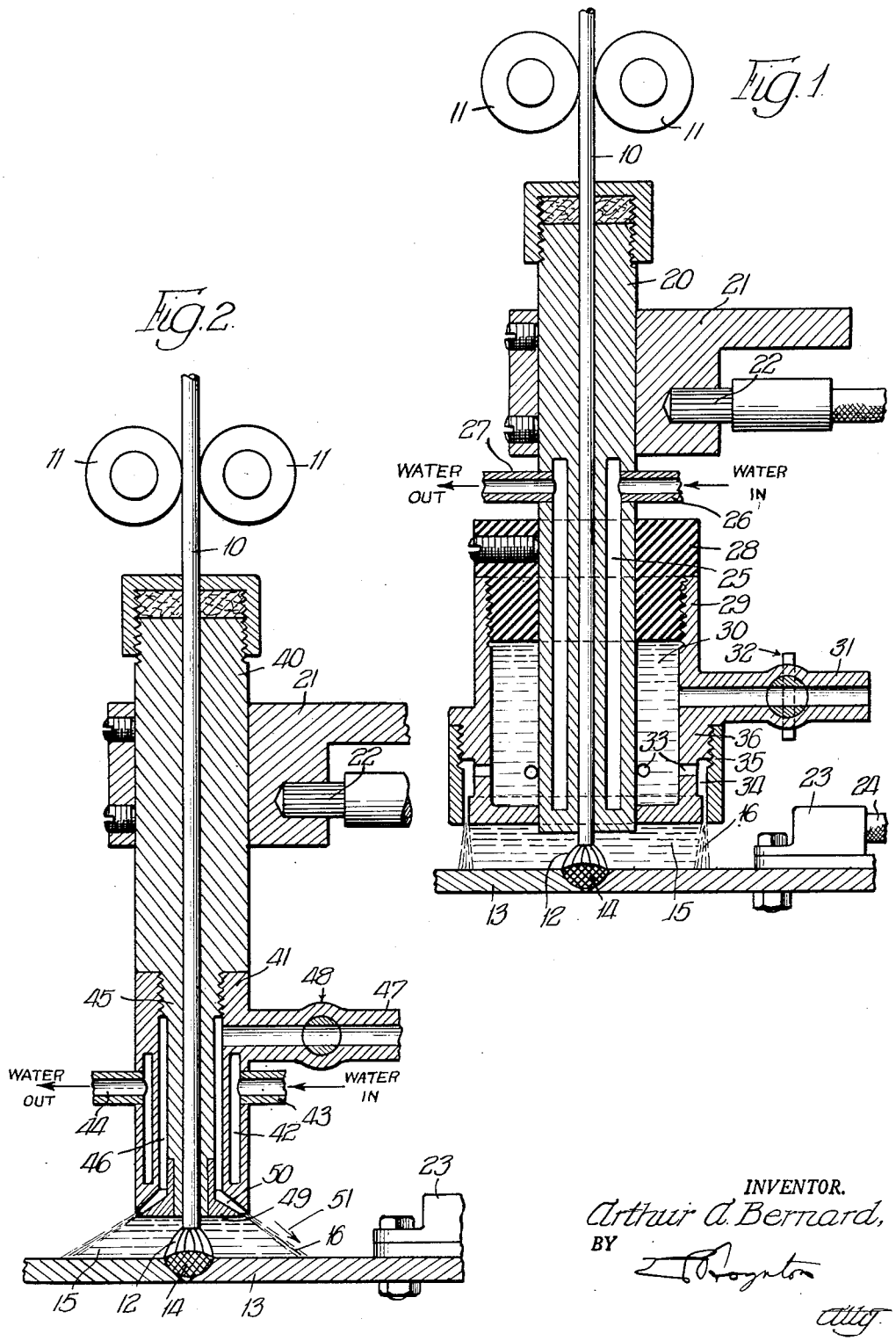

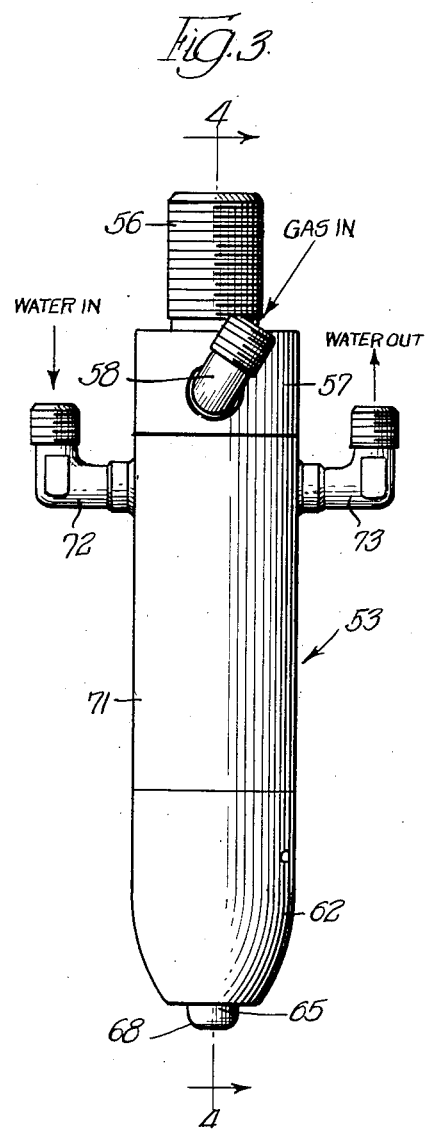
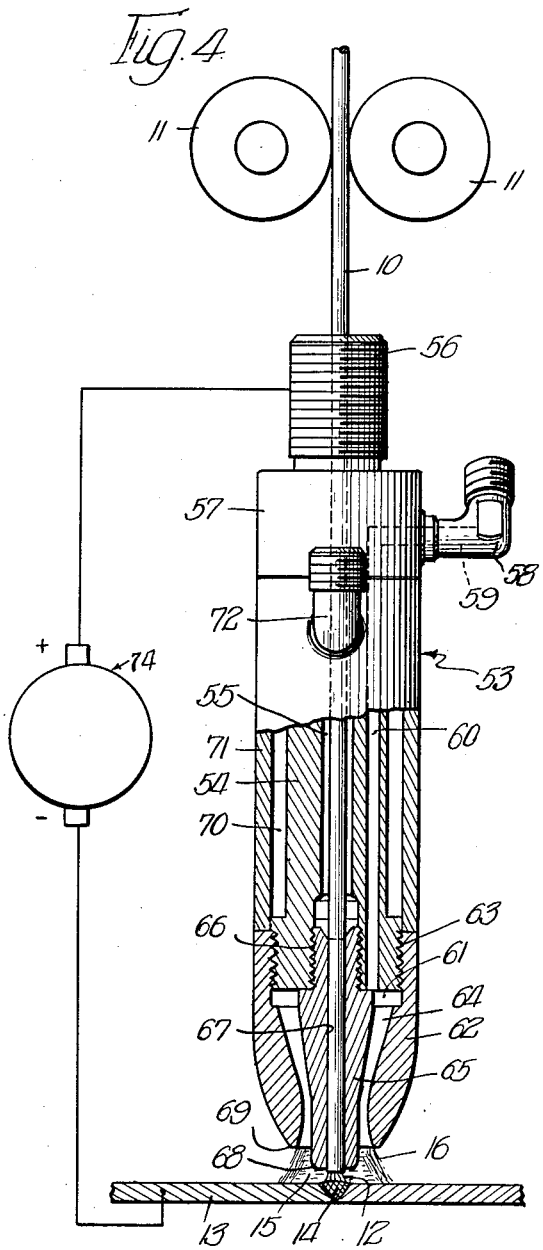

2,777,928

ARC WELDING METHOD AND MEANS

Arthur A. Bernard, Chicago, Ill., assignor to National Cylinder Gas Company, Chicago, Ill., a corporation of Delaware Application October 16, 1950, Serial No. 190,397

13 Claims. (Cl. 219—8)

My invention relates, generally, to arc welding, and it has particular relation to metallic arc welding apparatus and methods. This application is a continuation-in-part of my copending application, Serial No. 609,090, filed August 6, 1945, now Patent No. 2,590,084, dated March 25, 1952.

In my copending application I have pointed out that improved metallic arc welding operations using a bare metallic electrode can be carried out provided that certain precautions are taken to maintain the arc uncontaminated by the atmosphere and by the shielding gas that is employed to exclude the atmosphere. More specifically, I have shown that the arc is properly maintained when it is surrounded by gas or metal vapor that is arc generated and this gas or metal vapor is separated from the atmosphere by an envelope of shielding gas that is relatively inert. For this purpose helium has been found to be particularly useful although other inert gases, such as argon and carbon dioxide, may be used.

It is particularly important that the arc itself be maintained only in the arc-generated gas or metal vapor; that the ordinary atmosphere be wholly excluded from the arc stream; and that the inert shielding gas (by means of which exclusion of atmospheric air is accomplished) be itself excluded from the arc to the maximum extent compatible with the necessarily close juxtaposition of the inert shielding gas and the arc.

In theory, the arc path through which metal is transferred from a metal electrode to a base metal may be considered to exist as a narrowly defined zone closely surrounded by a second zone or region composed of metal vapors and arc-generated gas. As a practical matter, the boundaries of these two zones are not distinguishable, and the two together are regarded as the arc itself. Access of air or the ordinary atmosphere to the arc thus constituted normally results in a serious degree of oxidation, or formation of metal nitrides, or both in the weld metal, usually accompanied by extensive porosity or "gassing" of the deposited weld metal, and in some cases it may largely prevent the stable, smooth arc action that is necessary for efficient and uniform deposition of metal to create a strong and sound weld.

The prevention of these effects of the atmosphere on the arc and on the resulting weldment is the usual object of shielding means and methods heretofore proposed in connection with arc welding. While the provision of chemical and mechanical shields through fluxes applied either to the welding electrode or over and around the seam to be welded are most widely known and used, there have been numerous proposals involving the use of gaseous shields, although none of these prior to my invention has resulted in a successful arc welding technique that could be compared to those involving chemical fluxes.

A primary reason for the lack of success attending those prior proposals for the application of gaseous shielding to metallic arc welding undoubtedly resides in the failure of the prior workers to recognize that uncontrolled intermingling of an extraneous gas, regardless of its inertness per se, with the metal vapor or arc-generated gas of the arc, that is, into the arc itself, causes interruption of smooth arc action, sharply decreases metal transfer through the arc, and so seriously interferes with the essentials of arc stability and efficiency as to preclude practical arc welding.

It is, of course, not possible completely to exclude a shielding gas from the arc stream because of the laws that govern gaseous diffusion. It is, however, possible to prevent turbulent or forcible intermixing of an inert shielding gas with the arc-generated gases, and my investigations have shown that such minor penetration of the arc stream by the gas of an enveloping and protective gaseous blanket as is due solely or principally to diffusion is not deleterious to the efficient function of the arc.

In my copending application, referred to above, I have shown two general types of welding nozzle constructions which may be employed to provide the desired welding conditions just outlined. One of these nozzle constructions makes use of an inverted cup around the zone of the welding arc and into which an inert gas is introduced for shielding the arc-generated gas or metal vapor from the atmosphere. The other nozzle construction is of the open type and does not employ the inverted cup. The jaws of the nozzle which make contact with the welding electrode project further from the nozzle than any other part thereof toward the base metal or work. The blanket or envelope of shielding gas is maintained around the arc-generated gas or metal vapor by causing the inert gas to flow from an annular opening concentric with the welding electrode toward the base metal or the work. These nozzle constructions can be cooled by circulating a coolant, such as water, therethrough for removing some of the heat which is absorbed from the arc. This extraction of heat from the welding nozzle lowers its temperature to a point where molten particles from the arc which impinge on the nozzle do not fuse thereto, particularly in the annular opening through which the inert gas flows and cause an unequal distribution of the flow thereof around the arc-generated gas or metal vapor which the inert gas protects from contact with the atmosphere. The coolant also serves to lower the ionization potential of the inert gas within or about the nozzle to a point where a corona is not likely to form between the nozzle and the work. However, it is unnecessary to employ a coolant if the rate of flow of inert gas is great enough to prevent its ionization within or closely adjacent to the nozzle.

When the inverted cup type of welding nozzle is employed, the results obtained tend to be somewhat erratic when reasonable physical dimensions of the components are employed. This is due to the fact that the zone of conductivity may shift from the arcing end of the welding electrode to other points around the nozzle with the result that the arc may tend to wander erratically, or the body of inert gas confined within the cup may become sufficiently ionized to cause a corona to form with a consequent loss of welding arc action.

Further experimental work has indicated that the open type of nozzle in which the electrode contacting jaw and the electrode project further toward the work than any other part of the assembly, and in which a continuous, flowing curtain of gas shields the arc, overcomes those difficulties encountered in the use of an inverted cup type of nozzle of practical dimensions, and also enables the corona effect to be avoided. Highly satisfactory welding operations can be performed employing the open type of nozzle, and it is to improvements in this form of nozzle that my present invention is particularly directed.

Accordingly, among the objects of my present invention are: To improve the operating characteristics of a welding arc drawn between a bare metallic welding electrode and a base metal or work on which the welding operation is to be performed; to feed the electrode through a metallic welding nozzle with the electrode projecting beyond all parts of the nozzle; to direct an annular flow of an inert or shielding gas around the metal vapor or arc-generated gas of the welding arc in such manner that it excludes the atmosphere from the arc-generated gas or metal vapor and does not itself deleteriously penetrate the arc to the extent of disturbing the arc stream; to cause a lamellar flow of the inert gas around the envelope of arc-generated gas so as to avoid turbulence and intermixing therewith; to construct the nozzle so that the electrode gripping jaw or the portion that provides the principal electrical contact with the bare electrode projects beyond the portion or skirt that serves to direct the annular flow of inert gas; to provide for removing the jaw and skirt as a unit from the other parts of the nozzle in the event that they should become fused together by molten metal spray from the arc; and to extract heat from the nozzle at a rate sufficient to maintain its temperature sufficiently low to minimize adherence of molten metal particles, particularly in the annular passageway through which the inert gas flows, thereby to insure a uniform flow thereof, and also to reduce ionization of the inert gas and thereby to avoid formation of a corona.

Other objects of my invention will, in part, be obvious and in part appear hereinafter.

My invention is disclosed in the embodiments thereof shown in the accompanying drawings and it comprises the features of construction, combination of elements, arrangement of parts and method steps which will be exemplified in the construction hereinafter set forth and the scope of the application of which will be indicated in the appended claims.

For a more complete understanding of the nature and scope of my invention, reference can be had to the following detailed description, taken together with the accompanying drawings, in which:

Figure 1 is a longitudinal sectional view of a welding nozzle that is arranged to be water-cooled and to direct an annular flow of inert gas around the arc-generated gas or metal vapor;

Figure 2 is a longitudinal sectional view of another nozzle constructed in accordance with my invention in which the inert gas is directed to flow in a conical configuration;

Figure 3 is a view, in side elevation, of still another embodiment of welding nozzle construction; and Figure 4 is a view, partly in section and partly diagrammatic, showing the internal details of construction of the nozzle illustrated in Figure 3, and its operation in metallic arc welding according to this invention.

Referring now particularly to Figure 1 of the drawings, it will be observed that the reference character 10 designates a bare metal electrode which may be fed by feed rollers 11 to maintain an arc 12 between its lower end and base metal or work 13. The heat of the arc is sufficient to melt the base metal or work 13 so that a pool of molten metal 14 is maintained as indicated. The arc 12 is in part composed of and in part surrounded by arc-generated gas or metal vapor that is indicated at 15, although this region is somewhat exaggerated for purposes of clarity. In accordance with this invention the arc-generated gas or metal vapor 15 is surrounded by an envelope 16 of inert shielding gas which serves to exclude the atmosphere from the body of arc-generated gas or metal vapor 15 and also from the arc 12. Thus, the body of arc-generated gas or metal vapor 15, together with such minor proportions of inert gas from the envelope 16 as are inevitably present through diffusion, is the only matter in contact with the arc 12 and the molten metal 14. It has been found that the arc 12 becomes unstable and may be extinguished in the event that it is penetrated to any substantial extent by the inert shielding gas, and such penetration of the arc by the inert gas, or any appreciable dilution of the arc stream by the shielding gas, appears inevitably to alter the conductivity of the arc path to an extent sufficient to cause unstable arc operation, or its ultimate failure. On the contrary, when the arc 12 is enclosed by the arc-generated gas or metal vapor 15 only, a smooth, stable arc is easily maintained. Nevertheless, it is necessary that the envelope 16 of inert shielding gas be maintained in order to exclude atmospheric air from the zone or zones constituted by the arc-generated gas or metal vapor 15 and the arc 12. Thus, it is necessary to maintain a nice balance between atmospheric pressure, the pressure of the envelope of inert shielding gas 16, and the pressure of the arc-generated gas or metal vapor 15. The flow of inert shielding gas to maintain the envelope 16 is adjusted so that atmospheric air is excluded from the region of the arc-generated gas or metal vapor 15 and yet its pressure and flow must be insufficient to cause the inert gas to intermix therewith in an amount sufficient to affect the arc 12 and to dilute or otherwise disturb the arc stream. This balance between the several pressures involved is determined by the operation of the arc 12, and the flow of the inert shielding gas is adjusted to maintain the envelope 16 so that a smooth, stable arc is uniformly maintained.

It will be observed that the electrode 10 is fed by the feed rollers 11 through an electrode holder or jaw 20 that preferably is formed of material having good electrical and heat conducting properties, such as copper. A connector 21 is secured to the electrode holder or jaw 20 near its upper end for supplying current thereto. The current may be obtained by a conductor 22 from a suitable source as will be understood readily, the conductor 22 being connected to the connector 21 as shown. In accordance with conventional practice the base metal or work 13 is connected to another terminal of the current source. This may be accomplished through connector 23 and conductor 24.

It is desirable to extract heat absorbed from the arc 12 from the electrode holder or jaw 20 for the reasons pointed out above. For this purpose, an annular chamber 25 may be provided within the body of the electrode holder 20 near its lower end, and a coolant, such as water, may be circulated therethrough by way of water inlet 26 and water outlet 27.

The electrode holder 20 extends through an insulating bushing 28 into a cylindrical housing 29, the inner wall of which with the outer surface of the electrode holder 20 defines an annular chamber 30 supplied with a suitable shielding gas, such as helium, argon, or carbon dioxide, by means of conduit 31. Valve 32 in the conduit 31 is provided for regulating the flow of shielding gas through the conduit 31 into the chamber 30. Ports 33 in the wall of the housing 29 open into an annular chamber 34 which is defined by the inner surface of a ring 35 and the outer surface of the lower end of the housing 29. The ring 35 is threaded, as indicated, onto a flange 36 formed on housing 29. This annular chamber 34 serves to distribute shielding gas so that it flows uniformly to create the envelope 16 which is generally annular in configuration and constitutes a curtain surrounding the body of arc-generated gas or metal vapor 15 and the arc 12, as illustrated, to preclude its contact with air.

In Figure 2 of the drawings another and somewhat similar embodiment of the invention is illustrated. Since certain of the elements illustrated in Figure 1 also appear in Figure 2, they will be identified by the same reference characters. The nozzle construction in Figure 2 includes an electrode holder or jaw 40 which corresponds to the electrode holder or jaw 20 of Figure 1. The electrode holder or jaw 40 has a cylindrical fitting 41 threaded onto its lower end and is provided with an annular chamber 42 through which a coolant, such as water, can be circulated from inlet 43 to outlet 44, as shown. The lower end 45 of the electrode holder or jaw 40 is reduced in diameter so that its outer surface and the inner surface of the fitting 41 together define an annular chamber 46 which communicates with a conduit 47 that is connected to a suitable source of shielding gas. Valve 48 in the conduit 47 serves to regulate the gas flow into the chamber 46.

At the extreme lower end of the electrode holder or jaw 40 there is a conical bushing 49, the upper surface of which the lower end of the fitting 41 defines a conical discharge opening 50 to direct the flow of the inert shielding gas in the direction indicated by the arrow 51 so that the envelope or gas curtain 16 has a conical configuration rather than the cylindrical configuration illustrated in Figure 1.

In Figures 3 and 4 of the drawings there is illustrated, generally, at 53 still another embodiment of the electrode holder or nozzle constructed in accordance with my invention. As illustrated more clearly in Figure 4, the electrode holder or nozzle 53 includes a central cylindrical body member 54 having a central longitudinal passageway 55 the diameter of which is somewhat greater than that of the electrode 10 so that the latter can be fed readily therethrough. The body member 54 has an extension 56 that is threaded, as indicated, for mounting on a suitable nozzle support mechanism that may be associated with the feed rollers 11 and may constitute a part of an automatic arc welding head, the details of construction of which are well known and form no part of the present invention.

The body member 54 has an enlarged cylindrical upper end 57 on which a connector fitting 58 is mounted and arranged to be connected to a suitable source of shielding gas, such as helium, argon, or carbon dioxide. The fitting 58 communicates through a transverse passageway 59 in the upper end 57 with a longitudinal passageway 60 that extends through the body member 54 parallel to the central longitudinal passageway 55. At its lower end, the passageway 60 opens into an annular or ring-like opening 61 which is defined, in part, by the lower end of the body member 54 and a portion of the inner surface of a skirt 62 which, as indicated at 63, is threaded onto the lower end of the body member 54. The annular opening 61 is provided to distribute uniformly the shielding gas supplied by the passageway 60 into an annular opening 64 having a Venturi cross-section which causes the inert gas to flow in a lamellar fashion to define the envelope 16 of inert shielding gas around the arc-generated gas or metal vapor 15 and arc 12.

The annular opening 64 is defined, in part, by the inner surface of the skirt 62 and, in part, by the outer surface of an electrode jaw 65 which is threaded, as indicated at 66, into the lower end of the body member 54. The electrode jaw 65 has a central longitudinal opening 67 therethrough for receiving the electrode 10 and directing it to the arc 12. The diameter of the opening 67 is so related to the diameter of the electrode 10 as to provide electrical contact engagement therewith for conducting the welding current thereto.

As indicated, the skirt 62 is threaded at 63 onto the lower end of the body member 54, and the electrode jaw 65 is threaded thereto at 66. These threads are formed so as to have the same number of threads per inch. The purpose of this is to facilitate the removal of the skirt 62 and the electrode jaw 65 as a unit from the lower end of the body member 54 in the event that they should become accidentally fused together by molten metal from the arc 12. It will be seen that this construction greatly simplifies the removal and replacement of the skirt 62 and the electrode jaw 65, and makes adjustment of these members relative to each readily possible.

It is preferable that the lower end 68 of the electrode jaw 65 projects below the lower end 69 of the skirt 62. In the experiments which I have conducted in which the welding electrode 10 has a diameter of 1/8 inch and it and the base metal or work 13 are formed of austenitic stainless steel, I have found that the distance between the lower end 68 of the electrode jaw 65 and the lower end 69 of the skirt 62 should be about 3/16 inch. A similar distance should be maintained between the arcing end of the electrode 10 and the upper surface of the base metal or work 13. Stated more generally, the electrode jaw member should extend beyond the extremity of the parts of the assembly for a distance approximately equal to the electrode diameter, and an arc length of approximately the diameter of the electrode should be maintained.

In order to prevent the fusion of molten metallic particles from the arc 12 to the skirt 62 and the electrode jaw 65 and the resultant partial closure of the lower end of the annular opening 64, as well as to insure the avoidance of corona, provision is made for circulating a coolant, such as water, through the electrode holder or nozzle 53. For this purpose an annular opening 70 is provided in the body member 54. The annular opening 70 is defined by an annular groove in the outer surface of the body member 54 and a sleeve 71 which is positioned therearound and secured thereto by any suitable means, such as by silver solder. Connector fittings 72 and 73 are provided as shown more particularly in Figure 3 for conducting water into and out of the annular opening 70.

It is preferable that the skirt 62 and electrode jaw 65 be formed of metal having relatively good heat conductivity. For example, I have found that, when they are formed of copper, and the body member 54 also is formed of copper, water can be circulated through the annular opening 70 at a rate sufficient to remove or extract heat from the electrode holder or nozzle 53 to maintain the temperature of the skirt 62 and the electrode jaw 65 low enough to minimize fouling by molten metal particles as well as to preclude formation of a corona and consequent dissipation of arc energy.

It will be observed that a direct current generator has been indicated diagrammatically at 74. Also, it will be noted that the positive terminal of the generator 74 is connected to the electrode holder or nozzle 53 while its negative terminal is connected to the base metal or work 13. This arrangement is known in the art as a reverse polarity connection for maintaining the welding arc 12, and has been found to provide superior results using the electrode 10 and work 13 having the characteristics outlined before. It is also possible to employ the principles of this invention using direct current connected for straight polarity, and to employ alternating current with or without superimposed high frequency energy to further stabilize the arc.

In each of the embodiments of the invention disclosed herein the welding electrode 10 is fed toward the base metal or work 13 at a rate such as to maintain the arc 12 and the required amount of molten metal 14. The flow of inert gas is adjusted so that it does not create turbulence or disturb the normal operation of the arc 12 and yet forms a shield or curtain that surrounds the arc-generated gas or metal vapor 15 and excludes contact of the latter and the arc 12 with atmospheric air. As indicated hereinbefore, the proper flow of the inert gas is determined by the operation of the arc 12, and the formation of a uniform, sound weld is perhaps the best criterion of the proper regulation of the factors of gas flow, current density, welding speed, and the like.

In general, when welding nozzles as exemplified by Figures 3 and 4 are used, shielding gas flow of the order of 5 to 25 cubic feet of gas per hour is satisfactory, and the gas should be supplied to the nozzle at a pressure of only a few ounces above atmospheric pressure, for example, from about 1 to 10 ounces above atmospheric pressure. Welding with direct current connected in reverse polarity may be satisfactorily carried out with current densities in the range of about 20,000 to 30,000 amperes per square inch of electrode cross-section with the arc length controlled so that resultant in voltages across the arc of from about 18 to 24 volts are obtained. Greater gas flows than those specified may, of course, be used, but these are not necessary and are usually undesirable since the higher rates of flow tend to increase the likelihood of possible interference with the arc through its disturbance by or dilution with the shielding gas.

The practice of the invention using the embodiment shown in Figures 3 and 4 will be illustrated by the following examples:

*Example 1*

Square butt welds were made between stainless steel plates ⅛ inch in thickness using a stainless steel electrode of 3⁄32 inch diameter fed through a nozzle as shown in Figures 3 and 4, and mounted on a conventional automatic welding head associated with its usual travel devices. Both of the plates and the electrode were composed of type 302 stainless steel. The weld was made at the linear rate of 46 inches per minute, using helium as the shielding gas. The rate of helium flow from the nozzle was approximately 5 cubic feet per hour. The welding current was supplied by a direct current generator connected to the electrode and the work in reverse polarity at 185 to 190 amperes with the arc length controlled to produce a voltage across the arc of 21 and 22 volts. The weld bead formed between the plates was uniform, had a finely rippled surface, and was fairly high crowned. The weld exhibited no apparent oxidation, and was sound and completely free from porosity. In chemical composition, the weld metal closely corresponded to the type 302 stainless steel parent metal, and the weld readily conformed to the expected standards of physical strength and ductility.

At the welding speed employed, the degree of penetration of the base plates by the weld was about 50% to 60%, but the extent of penetration can be readily varied in accordance with the welding speed chosen, as well as by the current density employed.

*Example 2*

A welding operation was conducted exactly as described in Example 1, except that the welding electrode was ⅛ inch in diameter, the welding current was 280 to 285 amperes, and the rate of electrode feed toward the work was such as to maintain the voltage across the arc between 20 and 21 volts.

In this operation, the penetration of the base plates was about 75% to 80%, and the weld bead was larger in cross-sectional area. As in Example 1, the bead was fairly high crowned, uniformly rippled, sound, strong and free from porosity or apparent oxidation.

It will be obvious from the foregoing description and the data provided by the examples, that the practice of this invention permits a wide variety of conditions to be employed and enables results to be attained that have heretofore not been possible in arc welding operations using a bare metallic electrode. This is especially true in the case of the welding of stainless steel using uncoated continuous stainless steel electrodes.

In any case the welding operation may be carried on smoothly, and a stable arc maintained between the welding electrode and the work. Virtually any desired degree of penetration of the base metal can be obtained in the practice of this invention and the characteristics of the resulting weld metal are excellent. It is only necessary to insure that a continuous flowing curtain of shielding gas envelopes the arc-generated gases to protect the arc and the region of the arc-generated gases from contact with atmospheric air while correlating the shielding gas rate and direction of flow and its pressure so as to prevent substantial dilution of the arc-generated gases by the shielding gas or interference with the arc.

Various changes can be made in the construction and methods described above, and different embodiments of the invention can be made without departing from its spirit and scope. Accordingly, it is intended that all that is shown in the accompanying drawings and described herein shall be understood as illustrative and not as restrictive of the invention, and that the present invention be accorded its fullest scope as defined by the appended claims.

I claim:

1. In an apparatus for arc welding a base metal, a metal electrode to form an arc for transferring metal from the electrode to the base metal, and means including an annular nozzle to form an annular continuous curtain of shielding gas surrounding the arc, said curtain of gas being the only means for enclosing said arc and arc generated gas, said curtain of gas being directed against the base metal at such an angle that no component of said curtain of gas is directed toward said arc to enclose the arc and the arc-generated gas and to exclude atmospheric air from access to the arc while being itself substantially excluded from the arc and from deleterious intermingling with arc-generated gases.

2. An apparatus as set forth in claim 1 in which said nozzle is constructed and arranged to direct said gas in the form of a conical gas curtain flared outwardly away from the arc.

3. In welding apparatus wherein an arc is maintained between a consumable metallic electrode and work on which the welding operation is to be performed for transferring metal from the former to the latter, a nozzle for guiding said electrode toward said work, said nozzle having an annular opening around and spaced from said electrode shaped to direct a flow of gas in the form of an annular continuous curtain of gas around and out of contact with said arc and enclosing the region of gas generated thereby, said nozzle directing said curtain of gas toward said work at such an angle that no component of said curtain of gas is directed toward said arc, and gas supply means arranged and adapted to cause gas to flow through said annular opening at a pressure slightly above atmospheric pressure but less than the pressure of said arc-generated gas whereby said arc is enclosed and protected from contact with the atmospheric air.

4. The invention as set forth in claim 3, wherein the shape of the annular opening in the nozzle is such as to cause gas to flow in hollow conical configuration around the region of arc-generated gas.

5. In welding apparatus wherein an arc is maintained between a consumable metallic electrode and work on which the welding operation is to be performed for transferring metal from the former to the latter, an elongated nozzle of metal of high electrical and heat conductivity having a longitudinally extending centrally located opening through which said electrode is movable toward said work, an electrode guide at the arc end of said nozzle having a longitudinally extending opening for said electrode in which electrical contact is made therewith, and a skirt at the arc end of said nozzle around and spaced from said electrode guide to define therewith an annular opening to direct a flow of gas around said arc, said electrode guide and skirt being threaded on said nozzle and each having the same number of threads per unit length whereby they can be removed as a unit from said nozzle.

6. In welding apparatus wherein an arc is maintained between a consumable metallic electrode and work on which the welding operation is to be performed for transferring metal from the former to the latter, an elongated nozzle of metal of high electrical and heat conductivity having a longitudinally extending centrally located opening through which said electrode is movable toward said work, an electrode guide at the arc end of said nozzle threaded into said opening and having a longitudinal opening for said electrode of less diameter than said opening in said nozzle in which smaller diameter opening electrical contact is made with said electrode, a skirt threaded on said arc end of said nozzle around and spaced from said electrode guide to define therewith an annular opening having a Venturi shaped longitudinal cross-section to direct a lamellar flow of gas around said arc, and gas supply means arranged and adapted to cause a gas to flow through said annular opening.

7. In welding apparatus wherein an arc is maintained between a consumable metallic electrode and work on which the welding operation is to be performed for transferring metal from the former to the latter, an elongated nozzle of metal of high electrical and heat conductivity having a longitudinally extending centrally located opening through which said electrode is movable toward said work, an electrode guide at the arc end of said nozzle threaded into said opening therein and having a longitudinal opening for said electrode of less diameter than said opening of said nozzle in which smaller diameter opening electrical contact is made with said electrode, a skirt threaded on said arc end of said nozzle around and spaced from said electrode guide to define therewith an annular opening having a Venturi shaped longitudinal cross-section to direct a lamellar flow of gas around said arc, said nozzle having a longitudinally extending passageway offset from its center and communicating with said annular opening through which the gas is supplied, an inlet connection on said nozzle communicating with said offset passageway for supplying gas thereto, said nozzle also having an annular passageway therein for circulation of a coolant therethrough and coolant inlet and outlet connections communicating with said annular passageway.

8. A method of arc welding which comprises: feeding a fusible consumable metal electrode toward a base metal to maintain an arc therebetween accompanied by an arc-generated gaseous element therearound, and continuously maintaining an annular continuous curtain of shielding gas surrounding the arc and the arc-generated gaseous envelop by passing a stream of shielding gas through an annular space surrounding the electrode, said shielding gas flowing at an angle and rate such that there is produced an annular continuous curtain of gas which excludes the atmosphere from access to said arc and said arc-generated gaseous envelop, and is itself substantially excluded from contact with thbe arc by said arc-generated gaseous envelop.

9. A method of arc welding which comprises: feeding a fusible metal electrode toward a base metal through a metallic nozzle and gas confining and distributing means to maintain an arc between said electrode and base metal accompanied by an arc-generated gaseous envelop therearound, continuously discharging a shielding gas from the arc end of said nozzle and gas confining and distributing means to maintain an unbroken envelop of shielding gas around the region of said arc-generated gas of such character that it excludes atmospheric air from contact with the arc and is itself substantially excluded from contact with the arc by said arc-generated gas, and circulating a coolant through said metallic gas confining and distributing means to extract heat therefrom.

10. A method of arc welding which comprises: feeding a fusible metal electrode through a metal nozzle toward a base metal to maintain an arc therebetween for depositing metal from the former on the latter in an atmosphere composed essentially of arc-generated gases, and continuously maintaining an unbroken flowing curtain of shielding gas entirely around the region of said arc-generated gases to surround the same and to exclude air from access to said arc and arc-generated gases while correlating the pressure, rate of flow and direction of flow of said shielding gas to exclude the same from said arc and from substantial intermingling with said arc-generated gases.

11. In welding apparatus wherein an arc is maintained between a consumable metallic electrode and work on which the welding operation is to be performed for transferring metal from the former to the latter, an elongated nozzle of electrical and heat conducting material having a longitudinally extending centrally located opening through which said electrode is movable toward said work, an annular opening having a Venturi shaped longitudinal cross-section at the arc end of said nozzle around said central opening shaped to direct a flow of gas around the region of gas generated by said arc but out of contact with the arc itself, and a shielding gas supply means arranged and adapted to cause shielding gas to flow through said annular opening at a pressure slightly greater than atmospheric pressure whereby said arc is enclosed by said shielding gas and protected from contact with the atmosphere and from disturbance or dilution by said shielding gas.

12. The method of claim 8 wherein the shielding gas is carbon dioxide.

13. In an apparatus for arc welding a base metal, a fusible consumable metal electrode to form an arc for transferring metal from the electrode to the base metal, feeding means for feeding said electrode toward said base metal to maintain an arc therebetween, and means including a nozzle to form an annular continuous curtain of shielding gas surrounding said arc, said curtain being the only means for enclosing said arc and the resultant arc-generated gaseous envelop, said curtain of gas being directed against the base metal through said annular nozzle at an angle and rate such that no component of said curtain of gas is directed toward said arc, said curtain of shielding gas excluding the atmosphere from access to the arc while being itself substantially excluded from deleterious intermingling with the arc-generated gaseous envelop.

References Cited in the file of this patent

UNITED STATES PATENTS

| | | |
|---|---|---|
| Re. 21,897 | Taylor | Sept. 2, 1941 |
| 903,826 | Arsem | Nov. 17, 1908 |
| 1,309,696 | Roberts et al. | July 15, 1919 |
| 1,716,614 | Bergman | June 11, 1929 |
| 1,746,207 | Alexander | Feb. 4, 1930 |
| 1,946,305 | Catlett | Feb. 6, 1934 |
| 2,053,417 | Brace | Sept. 8, 1936 |
| 2,468,804 | Breymeier | May 3, 1949 |
| 2,504,868 | Muller et al. | Apr. 18, 1950 |
| 2,510,205 | Baird | June 6, 1950 |
| 2,544,711 | Mikhalapov | Mar. 13, 1951 |

FOREIGN PATENTS

| | | |
|---|---|---|
| 863,983 | France | Jan. 8, 1941 |
| 546,961 | Great Britain | Aug. 7, 1942 |